United States Patent [19]

Thommes

[11] Patent Number: 4,918,285
[45] Date of Patent: Apr. 17, 1990

[54] SYSTEM FOR SUPPLYING POWER

[75] Inventor: James M. Thommes, Escondido, Calif.

[73] Assignee: Cyclomatic Industries, Inc., San Diego, Calif.

[21] Appl. No.: 204,640

[22] Filed: Jun. 9, 1988

[51] Int. Cl.⁴ .............................................. B23K 9/10
[52] U.S. Cl. ............................ 219/130.1; 219/121.54
[58] Field of Search ............ 219/130.1, 137 PS, 121.54

[56] References Cited

U.S. PATENT DOCUMENTS

| | | |
|---|---|---|
| Re. 31,544 | 3/1984 | Hedberg . |
| 3,530,359 | 9/1970 | Grist . |
| 3,728,516 | 4/1973 | Daspit . |
| 4,117,303 | 9/1978 | Hedberg . |
| 4,280,041 | 7/1981 | Kiessling et al. . |
| 4,300,035 | 11/1981 | Johansson . |
| 4,300,036 | 11/1981 | Johansson . |
| 4,382,171 | 5/1983 | Hedberg . |
| 4,410,788 | 10/1983 | Summers et al. . |

FOREIGN PATENT DOCUMENTS 2333594 1/1975 Fed. Rep. of Germany ... 219/130.1
55-109571 8/1980 Japan ................................. 219/130.1

Primary Examiner—Clifford C. Shaw
Attorney, Agent, or Firm—Majestic, Parsons, Siebert & Hsue

[57] ABSTRACT

A power supply is disclosed for both arc welding and plasma cutting. The power supply includes an A.C. power source, a transformer having a primary winding receiving power from the A.C. power source and a secondary winding. Power in the secondary winding is rectified by rectifier to provide a first output suitable for arc welding and a second output suitable for plasma cutting. A switch connected to the rectifier selects between the two outputs. Conventional power supplies employ an inductance for stabilizing the current in the plasma cutting power supply. According to another aspect of the invention, the power supply includes a circuit path in parallel to the inductance for passing additional current to the torch so that the open circuit voltage applied to the inductance required for sustaining the arc is reduced.

7 Claims, 4 Drawing Sheets

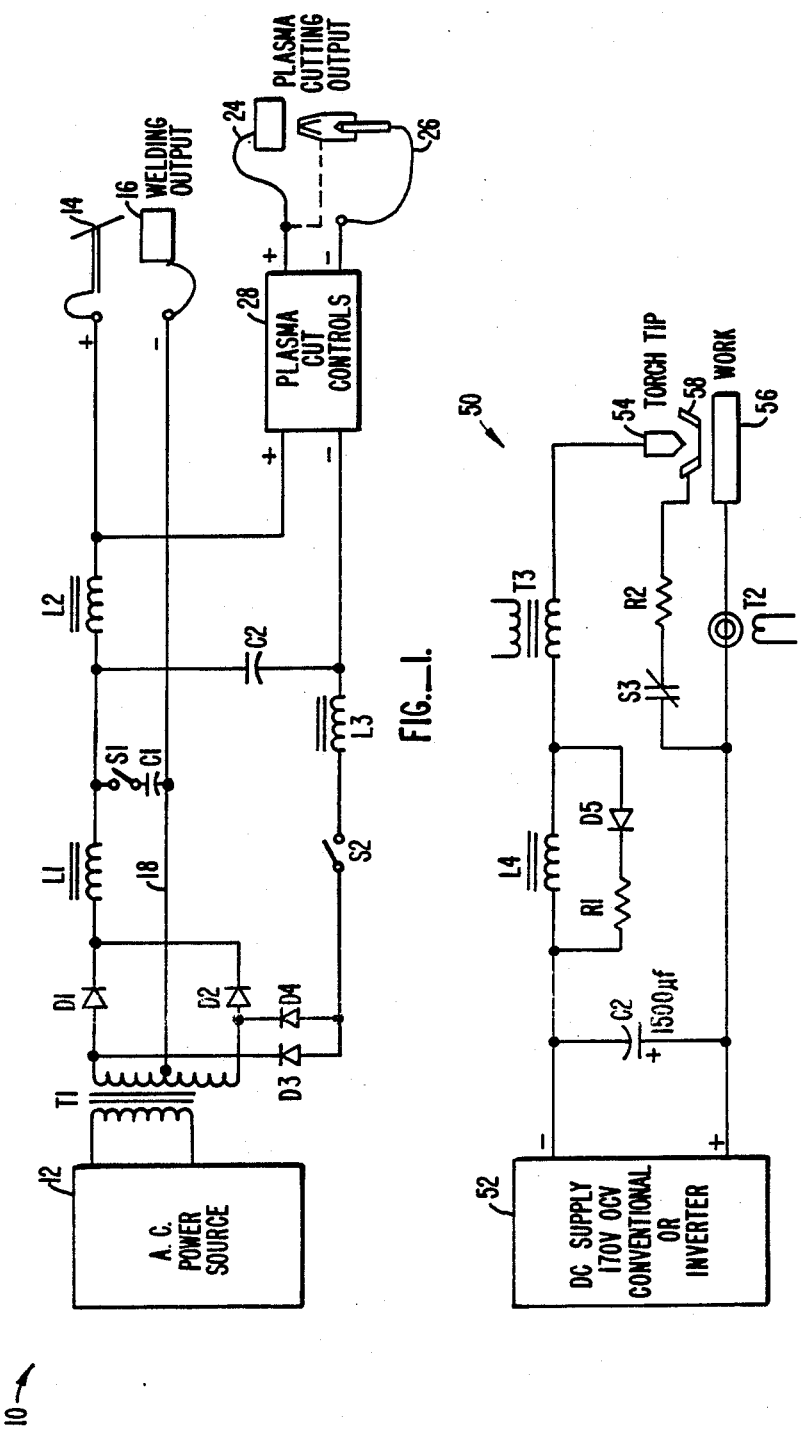

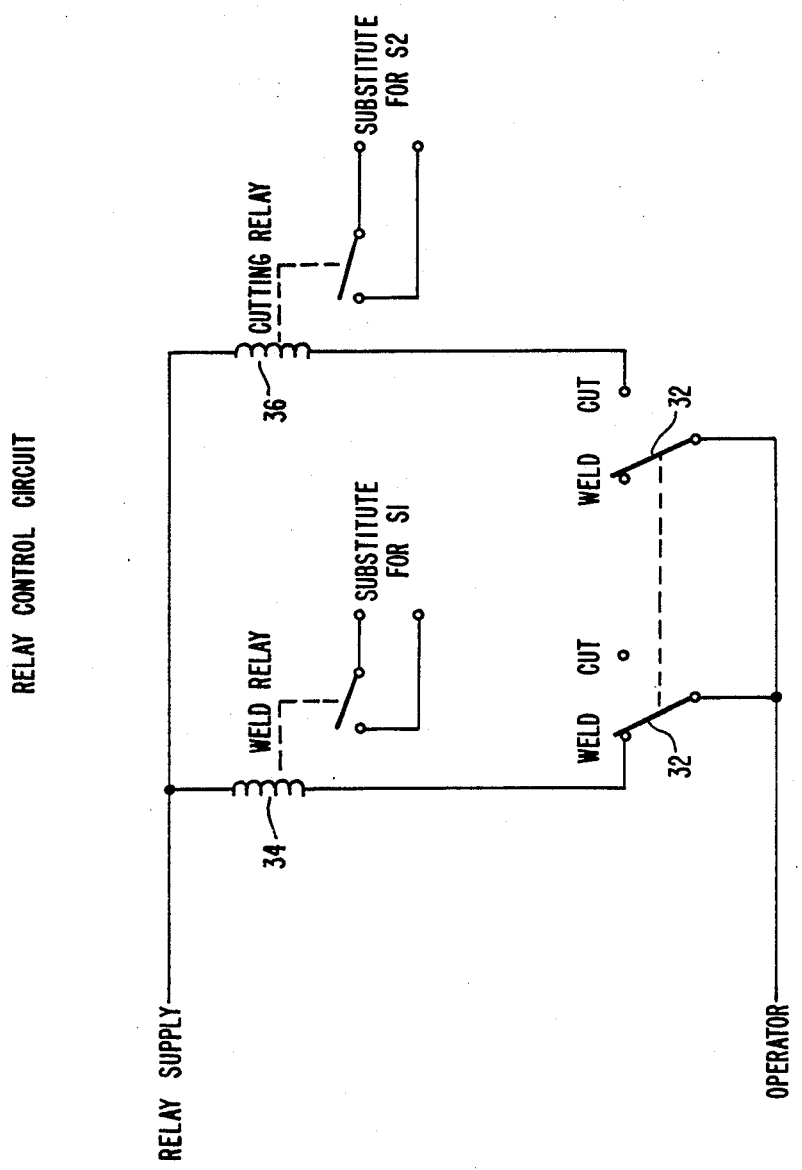
FIG._2.

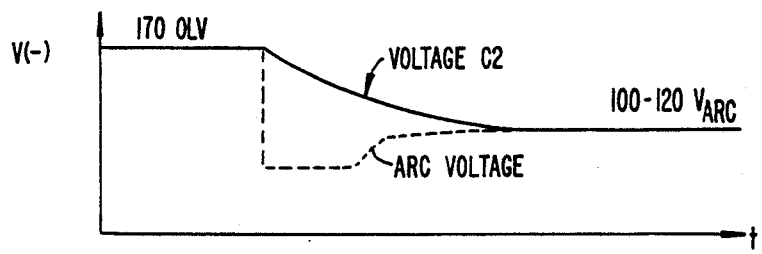
FIG._4A.
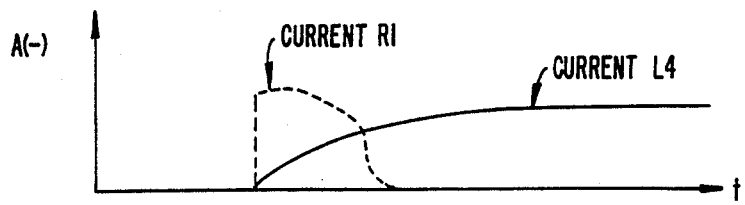
FIG._4B.
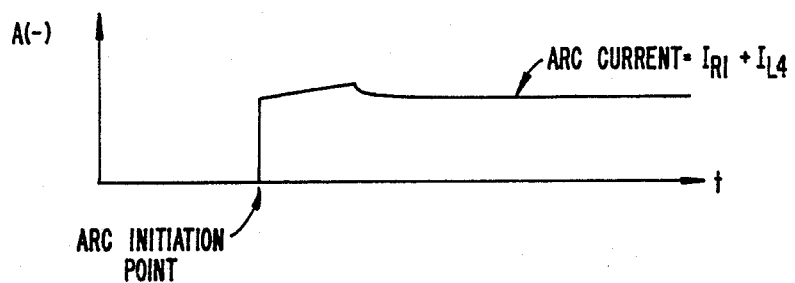
FIG._4C.
FIG._4.

SYSTEM FOR SUPPLYING POWER

BACKGROUND OF THE INVENTION

This invention relates in general to a power supply and more specifically to a system for supplying power for arc welding and for plasma cutting and to an improved plasma cutting power supply.

Arc welding and plasma cutting are two processes which are frequently used together in many applications in the welding industry. A piece of metal may first be cut using a plasma cutting process and then welded to a different metal piece using an arc welding process. Both processes require power supplies which supply power of certain characteristics to welding torches or to cutting torches. In conventional welding systems, two separate power supplies have been used, one for performing plasma cutting and the other for performing arc welding. Plasma cutting requires a power source which provides power at high voltages and low current: for example, for cutting metal of up to one-half inch, the voltage and current supplied are typically at 100–120 volts and 20–50 amperes. On the other hand, arc welding requires a power source which can provide power at high current and low voltage, typically at 250 amperes and 20–30 volts for welding metal of up to one-half inch in thickness. Because of these different requirements for plasma cutting and arc welding, two separate power supplies have been used in conventional welding and cutting systems.

When two separate power supplies are used for cutting and for welding, there must be two separate electrical connections to power mains. The operators of the welding systems must keep track of and maintain two different power supply units instead of one. Two power supply units must be transported and stored on the shop floor. It is therefore desirable to provide a single power supply unit which is capable of providing power at high voltage and low current as well as at high current and low voltage suitable for plasma cutting and arc welding.

In U.S. Pat. No. 4,410,788, Summers et al. describe a power and fluid supply source with multi-function cutting and welding capabilities. The power supply includes a main power transformer for supplying the main welding current and a separate very high voltage transformer for supplying very high voltages above 200 volts required in conventional cutting systems for plasma cutting. The two transformers are placed in parallel and a switch is used to selectively connect one of the two transformers to the output. In other words, Summers et al.'s device includes the essential components of two different power supply sources, one suitable for arc welding and the other suitable for plasma cutting. Thus Summer et al.'s device merely includes in one unit the essential components of both sources and further adds a switch for selecting one of the power units to be effective at any one time.

While Summers et al.'s device enables welding operators to handle only one supply source instead of two, little economic advantage is achieved. Summers et al.'s device appears to be just as heavy as the combined weight of a conventional cutting and a conventional welding power supply and appears to occupy essentially the same floor space. In fact an extra coupling switch must be used for selecting between the main power transformer and the very high voltage transformer. Summers et al.'s power supply is thus not entirely satisfactory. It is therefore desirable to provide an improved power supply suitable for both plasma cutting and arc welding.

As discussed above, one of the challenges in developing a combined plasma cutting and arc welding power supply arises from the fact that plasma cutting requires a much higher voltage compared to arc welding. In plasma cutting, an inductance is frequently used in the power supply circuit for stabilizing the arc current so that the cutting arc is smooth and stable. This is well known to those skilled in the art. Upon arc initiation, such stabilizing inductance would resist the passing of current so that a high open circuit voltage in the range of 260 to 360 volts is normally required to overcome the stabilizing inductance so that the cutting arc would not become extinguished after initiation. Such high open circuit voltage is undesirable since it is a shock hazard to the operator of the cutting equipment. Such high voltage requirement also makes it more difficult to develop a combined plasma cutting and arc welding power supply. It is therefore desirable to provide a power supply which retains the normal circuit stabilizing inductance for a good smooth, stable cutting arc, and which also enables a much lower open circuit voltage to be used for sustaining the arc after arc initiation.

SUMMARY OF THE INVENTION

One aspect of the invention is directed towards an apparatus for supplying power for arc welding and for plasma cutting. The apparatus comprises an A.C. power source, a transformer having a primary winding connected to the A.C. power source and a secondary winding. The apparatus further comprises rectifying means for rectifying the A.C. current in the secondary winding to provide a first output suitable for arc welding and a second output suitable for plasma cutting. The apparatus also includes switch means connected to the rectifying means for selecting between the first and second outputs.

Another aspect of the invention is directed towards an apparatus for supplying power to a plasma cutting torch. The apparatus comprises a D.C. power source and an A.C. power source where the A.C. source supplies a high voltage signal to the torch for initiating an arc at the torch. The apparatus also includes inductor means connecting the D.C. power source to the torch. The D.C. power source supplies a voltage to the inductor means for passing a current through the inductor means to sustain the arc after initiation. The inductor means is for stabilizing the arc. The apparatus further comprises a circuit path connecting the D.C. power source to the torch in parallel to the inductor means for supplying current to the torch immediately after arc initiation in addition to the current supplied by the inductor means to the torch so that the voltage applied by the D.C. power source to the inductor means required for sustaining the arc is reduced.

BRIEF DESCRIPTION OF THE DRAWINGS

FIG. 1 is a schematic circuit diagram of a power supply suitable for plasma cutting and arc welding to illustrate the preferred embodiment of one aspect of the invention.

FIG. 2 is a schematic circuit diagram of a relay control circuit for controlling the power supply of FIG. 1.

FIG. 3 is a schematic circuit diagram of a plasma cutting power supply to illustrate the preferred embodiment of another aspect of the invention.

FIGS. 4A-4C are graphical illustrations of the output characteristics of the power supply of FIG. 3.

DETAILED DESCRIPTION OF THE INVENTION

As discussed above, the device disclosed by Summers et al. in U.S. Pat. No. 4,410,788 is a combined welder and cutter power supply with two separate transformers. In contrast, the power supply 10 of FIG. 1 has only one secondary winding and only one secondary circuit is used. In reference to FIG. 1, the primary winding of a transformer T1 receives power from an A.C. power source 12 and the secondary winding of the transformer supplies power for both welding and cutting purposes. As shown in FIG. 1, welding output 14 and 16 receives power from the secondary winding of T1 through a center tap arrangement comprising two diodes D1, D2 each connected to an end of the secondary winding and a center tap connection 18. The secondary coil of transformer T1 may simply be of a gauge normally used for welding purposes. The center tap arrangement provides the welding outputs 14, 16 with the required low voltage and high current. What has been described so far in reference to FIG. 1 is the normal arrangement for a welding power supply. Inductances L1, L2 and capacitor C1 are used to reduce the high frequency noise and are the subject of U.S. Pat. No. 4,117,303 assigned to the assignee of this application.

According to one aspect of this invention, all the above described components used in a conventional welding power supply, except for capacitor C1, may be used together with other components in providing a plasma cutting power output. Thus, two extra diodes, D3, D4 form a full wave rectifier arrangement with diodes D1, D2. Since plasma cutting requires a lower current compared to welding, diodes D3, D4 may be smaller than D1, D2. This arrangement yields roughly twice the output voltage of a center tap arrangement on the same secondary winding.

The full wave bridge is filtered by inductances L1, L3, which must be of the same inductance value to balance the bridge, but L3 might be physically smaller due to a lower current which must be passed compared to inductance L1. Inductances L1, L3, L2 in combination with capacitor C2 reduce the high frequency noise in the cutting power outputs 24, 26 in accordance with the teaching of U.S. Pat. No. 4,117,303. Two switches S1, S2 control whether circuit 10 provides power to the welding outputs 14,16 or power to the cutting outputs 24,26 through plasma cut control circuit 28.

FIG. 2 is a schematic circuit diagram of a relay control circuit for controlling switches S1, S2 so that an operator may select powering either one of the two outputs. As shown in FIG. 2, an operator operates a switch 32 for selecting between powering the welding outputs or the cutting outputs. If the welding outputs are selected, switch 32 causes a weld relay 34 to be powered by a relay power supply for closing switch S1. Since the cutting relay 36 is not powered, switch S2 will remain open. If the operator selects to power the cutting outputs, switch 32 will be turned to power the cutting relay 36 instead, thereby causing switch S2 to close and S1 to remain open. In such manner, an operator selects either one of the two sets of outputs, but not both.

The A.C. power source 12 may be any one of a conventional type of controllable A.C. power source used in welding power supplies. It may advantageously be the type which includes a controlled frequency DC to AC inverter such as that described in U.S. Pat. No. 4,382,171 assigned to the assignee of the present application. The power supplied through the welding outputs 14,16 may be used in gas metal arc welding (GMAW), where a consumable electrode is used and where a constant arc length is maintained. The characteristics of GMAW-type power supply are described, for example, in U.S. Pat. Nos. 4,382,171 and Re.31,504, both of which are incorporated into this application by reference. In other words, where power supply 10 of FIG. 1 is used in GMAW-type process, power source 12 may advantageously be one of an inverter type described in U.S. Pat. No. 4,382,171 and Re.31,544.

FIG. 3 is a schematic circuit diagram of a plasma cutting power supply illustrating the preferred embodiment of another aspect of the invention. In contrast to conventional plasma cutting power supplies requiring a range of 260-360 volts open circuit voltage, power supply 50 of FIG. 3 employs a power source 52 which provides a D.C. supply of 170 volts open circuit voltage. Power supply 52 may be of a conventional design or of the inverter type described in U.S. Pat. No. 4,382,171 and Re.31,544. Capacitor C2 is the same as that shown in FIG. 1 and is used for reducing high frequency noise. Inductor L2 of FIG. 1 is omitted in FIG. 3 for clarity. Inductor L4 is the stabilizing inductance used also in prior art designs for sustaining and stabilizing the arc current after arc initiation so that a good smooth, stable cutting arc is provided. Thus, transformer T3 is used to inject a high voltage, high frequency signal or impulse for initiating an arc at the torch 54. A transformer T2 is used to sense whether the arc current has transferred to the work piece 56. When transfer current is sensed, switch S3 is opened to interrupt the pilot current from the torch to the torch tip 58. Resistor R2 is a current limiting resistor in the range of 0 to 2 ohms. The stabilizing inductance L4 frequently has a value range of 5 to 50 millihenries.

After the arc has initiated, the pilot arc is then between the torch 54 and tip 58, and current from supply 52 is required to sustain the pilot arc. In prior art designs, the stabilizing inductance L4 resists the building up of current to the torch 54 immediately after arc initiation. To overcome such resistance so that a sufficient current is passed to sustain the arc, the high open circuit voltage in the range of 260 to 360 volts is used in conventional designs. Such high voltage poses a shock hazard to the operator of the cutting equipment. The power supply of FIG. 3 is advantageous in that a much lower open circuit voltage, such as around 170 volts, is adequate for causing enough current though the torch and tip for sustaining the pilot arc. This is accomplished by employing a circuit path in parallel to the inductance L4 for passing current immediately after arc initiation so that the initial resistance of inductance L4 to current flow is no longer an impediment for passing current to sustain the arc.

As shown in FIG. 3, such circuit path includes a diode D5 and resistor R1. The characteristics of circuit 50 are illustrated in FIG. 4. As shown in FIG. 4A, the voltage across capacitor C2 is at 170 volts under open circuit conditions. After an arc is initiated through transformer T3 across torch 54 to tip 58, the arc voltage at torch 54 is shown in dotted lines in FIG. 4A. There is therefore a potential difference across the circuit path composed of diode D5 and resistor R1 as well as across inductance L4. As shown in FIG. 4B, the current in the inductor begins to build. If the circuit path composed of diode D5 and R1 were not present, such current through inductance L4 will be inadequate to sustain the arc. However the potential difference across the circuit path causes a current to flow through the circuit path, as shown in dotted lines in FIG. 4B. The combined current through the inductance and the circuit path is shown in FIG. 4C; such combined current forms the arc current through the torch 54 and tip 58. Thus, as illustrated in FIG. 4, the extra current which passes through the circuit path composed of diode D5, resistor R1 enables the arc to be established and sustained despite the inductance L4's resistance to current flow. After the arc has been successfully established, the common practice is to move the torch to the workpiece. The arc transfers to the workpiece, the transferred current is sensed by T2, S3 opens as previously described, and the cutting process is continued as is known in the craft.

Should weld conditions suddenly change at the torch or torch tip, inductance L4 would generate a back electromotive force. If the diode D5 is not present, this would cause a current path through resistor R1 and the torch 54 which is undesirable. Diode D5 prevents this from happening.

The aspect of the invention described in reference to FIGS. 3 and 4 may be advantageously combined with the aspect described in reference to FIGS. 1 and 2. As discussed above, the lowering of the voltage requirements for cutting enables much of the same components used in the power supply circuit for providing an arc welding output to be used as well for a plasma cutting output. Since the aspect of the invention described in reference to FIGS. 3 and 4 reduces the voltage requirement for plasma cutting, the design requirement for the power supply of FIGS. 1 and 2 is simplified. The circuit of FIG. 3 may be incorporated into that of FIG. 1 by simply employing the inductance L4 between inductance L3 and the plasma cutting control 28. The alternative circuit path of diode D5 and resistor R1 is then employed in parallel to inductance L4. Capacitor C2 in FIG. 3 is the same as that in FIG. 1. The D.C. supply 52 of FIG. 3 is simply replaced by power source 12, transformer T1, rectifier (D1-D4) and inductances L1, L3.

The above described embodiments are merely illustrative of the invention. Various changes in the details of implementation and other alternative implementations may be within the scope of the appended claims.

I claim:

1. An apparatus for supplying power for arc welding and for plasma cutting, said apparatus comprising:
   an A.C. power source;
   a transformer having a primary winding connected to the A.C. power source and a secondary winding;
   rectifier means for rectifying the A.C. current in the secondary winding to provide a first output and a second output; and
   switch means connected to the rectifier means for selecting between the first and second outputs, the power supplied by said A.C. power source being controllable such that the first output is suitable for arc welding and the second output is suitable for plasma cutting.

2. The apparatus of claim 1, wherein said rectifier means comprises a centertap arrangement for providing the first output and a full wave bridge rectifier arrangement for providing the second output.

3. The apparatus of claim 2, wherein said centertap arrangement includes a first and a second diode each connected to an end of the secondary winding, and wherein said full wave bridge rectifier arrangement comprises said first and second diodes and a third and a fourth diode.

4. The apparatus of claim 1, wherein the A.C. power source includes a controlled frequency D.C. to A.C. inverter means.

5. The apparatus of claim 4, wherein the power supplied by the A.C. power source is controlled by controlling the operating frequency of the inverter means.

6. The apparatus of claim 1, further comprising a first capacitor means connected to the first output means, a second capacitor means connected to the second output means to reduce audible noise, a first choke means connected between the two capacitor means and the two outputs and a second choke means connected between the two capacitor means and the rectifier means for smoothing signals at the two outputs and for preventing the capacitor means from affecting the rectifier means.

7. The apparatus of claim 1, wherein said A.C. power source is of a type that the power supplied at the first output maintains a substantially constant arc length for arc welding.

* * * * *